United States Patent [19]

Abbott et al.

[11] 4,091,682
[45] May 30, 1978

[54] DIGITAL DIFFERENTIAL PRESSURE MEASUREMENT APPARATUS

[75] Inventors: Arthur Robert Abbott; Walter Clark Milliken, both of Dover, N.H.

[73] Assignee: Sensor-Matic, Inc., Sparta, N.J.

[21] Appl. No.: 783,966

[22] Filed: Apr. 4, 1977

[51] Int. Cl.² .............................................. G01L 9/08
[52] U.S. Cl. ........................................ 73/702; 73/717
[58] Field of Search ............... 73/398 R, 407 R, 393, 73/205 R, 517 R, 398 C, DIG. 1, DIG. 4

[56] References Cited

U.S. PATENT DOCUMENTS

| | | | |
|---|---|---|---|
| 3,393,565 | 7/1968 | Klee | 73/398 R |
| 3,529,470 | 9/1970 | Agar | 73/407 R |

*Primary Examiner*—Donald O. Woodiel
*Attorney, Agent, or Firm*—Darby & Darby

[57] ABSTRACT

Apparatus for measuring a pressure differential in a fluid carrying conduit characterized by a digital representation of the rate of fluid flow and a high degree of accuracy is disclosed. The sensor portion of the apparatus includes two identical electrically driven piezoelectric crystals. One crystal provides a series of pulses at its resonant frequency for use as a reference signal. The second crystal provides a series of pulses at a frequency which is inversely related to a force applied thereto. The sensor further includes two (minimally) arcuately curved stainless steel sealing diaphragms urged in opposing directions by two pressures acting in opposing directions. The movement of the two diaphragms, which are rigidly connected to one another, and which is directly related to the difference in magnitude of the two pressures, is used to apply the force to the second crystal. The pulse trains provided by the first and second crystals are transmitted to a modulator which provides, as its output, a series of pulses at a frequency which is equal to the difference of the frequencies provided by the first and second crystals, this last frequency, which is subsequently provided to utilization apparatus, therefore being directly related to the difference between the first and second pressures.

9 Claims, 1 Drawing Figure

U. S. Patent      May 30, 1978      4,091,682
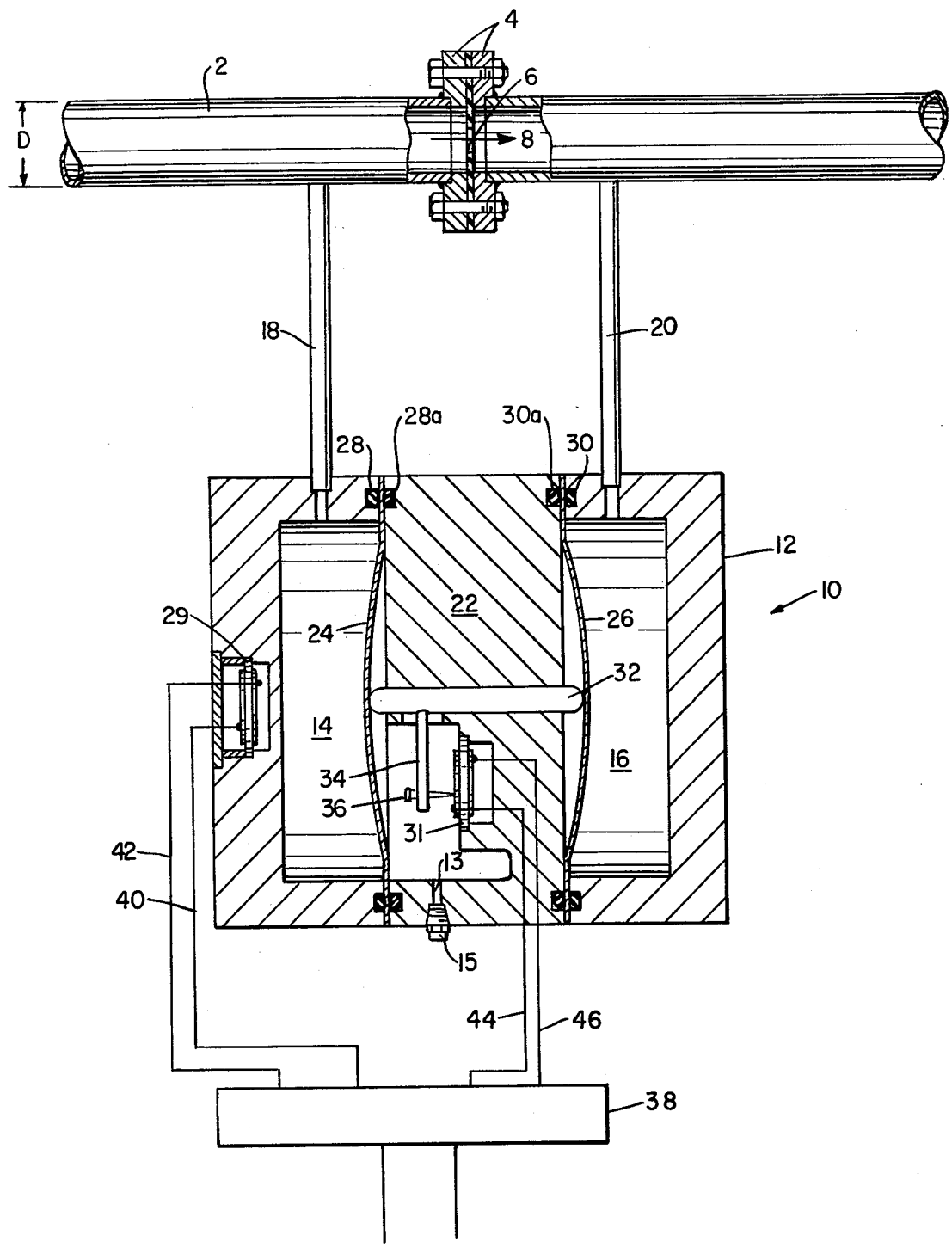

DIGITAL DIFFERENTIAL PRESSURE MEASUREMENT APPARATUS

This abstract is not to be taken either as a complete exposition or as a limitation of the present invention, however, the full nature and extent of the invention being discernible only by reference to and from the entire disclosure.

BACKGROUND OF THE INVENTION

This invention relates to apparatus for measuring fluid flow. More particularly, this invention relates to apparatus providing an accurate digital representation of fluid flow velocity.

It is well known in the art to determine the flow velocity of a fluid, for example, the flow rate of oil in a pipeline, by inserting an obstruction such as an orifice plate in the flow stream of the conduit and to measure the pressure differential between the upstream and downstream sides of the obstructing orifice plate. As is well known, the magnitude of this pressure differential is related to the rate of flow of the fluid by a square law function, that is, the measured differential pressure is, for most practical purposes, directly related to the square of the fluid velocity.

A major deficiency in presently utilized fluid flow rate measurement devices is that they are essentially analog devices. Due to both their mechanical complexity and due to the hysteresis of the diaphragms utilized, these devices do not provide the degree of accuracy that is frequently desired. Further, the determination of total flow over a period of time, which may be required, for example, in applications where it is desired to mix various fluids in predetermined quantities, requires mechanical linkages of a complexity which serves both to decrease accuracy and to increase the likelihood of device failure.

SUMMARY OF THE INVENTION

It is, therefore, an important object of the present invention to provide an improved digital differential pressure measurement apparatus by means of which the aforesaid drawbacks and disadvantages may be most efficaciously avoided.

It is a further object of this invention to provide a digital differential pressure measurement apparatus characterized by a high degree of accuracy.

It is yet another object of the present invention to provide a digital differential pressure measurement apparatus characterized by mechanical simplicity.

It is yet another object of the present invention to provide a digital differential pressure measurement apparatus which is characterized by the provision of flow rate and quantity information in digital form Generally speaking, the objectives of the present invention are attained by the provision of a digital differential pressure measurement apparatus comprising a first electromechanical transducer adapted to provide a first series of pulses at a first frequency, a second electromechanical transducer adapted to provide a second series of pulses at a second frequency, which second frequency is inversely related to a force applied to the second transducer, force applying means responsive to a pressure differential adapted to apply a force, directly related to the pressure differential, to the second transducer, and modulator means adapted to receive the first and second series of pulses and to provide a third series of pulses at a third frequency, the third frequency being directly related to the difference between the first and second frequencies.

The objectives of the present invention are also attained by the provision of a fluid carrying conduit having a first diameter, constriction means positioned within the conduit, the constriction means having a second diameter smaller than the first diameter, whereby the difference between the fluid pressure at opposite sides of the construction means is directly related to the flow velocity of the fluid, first pressure responsive means urged in a first direction in response to the fluid pressure at one side of the constriction means, second pressure responsive means urged in a second direction, opposite to the first the present invention will be more clearly understood from the following detailed description thereof when read in conjunction with the accompanying drawing in which the single FIGURE is a schematic representation of a digital pressure differential measurement apparatus according to the invention.

DESCRIPTION OF THE PREFERRED EMBODIMENT

Turning now to the single Figure, there is illustrated a conventional fluid flow conduit 2 through which a fluid, either liquid or gaseous, may flow. Positioned within the conduity 2, which has a diameter indicated at D, is an orifice plate 4 which has an aperture 6 of a diameter somewhat less than D formed therein. As is well known in the art, such a constriction is conventionally utilized for measuring fluid flow rates such as, for example, the flow rate of oil in pipeline. This is due to the fact that when fluid is flowing in the direction indicated by the arrow 8 through the orifice 6, the fluid pressure at the upstream side of the orifice plate 4 is higher than the pressure at the downstream side. Further, this pressure differential is directly related to the square of the velocity of the flow of the fluid. The relationship between pressure and flow velocity is expressed by the equation $V^2 = K(P_1 - P_2)$ where V is the fluid flow velocity, K is a constant, and $P_1$ and $P_2$ are the upstream and downstream fluid pressures, respectively.

A sensor structure, indicated generally at 10, includes a container 12 which may be made of any non-corrosive metal, such as, for example, stainless steel, and within which is maintained an inert gaseous atmosphere. The container 12 is sealed so as to be airtight in order that the sensor structure may be maintained free of contaminants. In construction of the sensor structure, it has been found advantageous to evacuate the cavity within the container 12 and to then purge and fill with an inert gas, such as, for example, nitrogen. For this purpose a passage 13, which may be sealed by a plug 15, is provided in the container 12. The presence of the inert gaseous atmosphere obviates the necessity of incorporating a weep hole in the container 12, and this in turn increases the likelihood that the crystals within the container will remain free of contamination. First and second pressure chambers, indicated at 14 and 16, respectively, are located within the container 12. Chamber 14 is connected, by means of a conduit 18, to the side of the fluid flow conduit 2 which is upstream of the orifice plate 4. Chamber 16 is connected, by means of conduit 20, to the side of fluid flow conduit 2 which is downstream of orifice plate 4. It will therefore be understood that the fluid within chamber 14 applies a pressure, indicated at $P_1$, against the walls thereof and that the fluid within chamber 16 applies a pressure, indicated at $P_2$, against the walls thereof.

Separating chambers 14 and 16 is a chamber 22, two walls of which are formed, in part, by arcuately curved stainless steel diaphragms 24 and 26. The diaphragms have an arc of curvature of approximately 0.0005° and a uniform thickness of between about 0.0005 and 0.25 inches, depending on the magnitude of the pressures with which the sensor is to be utilized. It has been found that utilizing diaphragms made of non-corrosive stainless steel or other, similar, low hysteresis metals and having such a physical configuration results in a structure suffering from a minimal amount of hysteresis. The remaining perimeter surfaces of the chamber 22 are formed by the container 12 and the chamber 22 is sealed from the remainder of the container 12 by O-rings, indicated at 28, 28a, 30 and 30a, which may, for example, be of silicon. Maintained at any convenient location within the chamber 22 is a piezoelectric crystal 29, having a known resonant frequency, for example, 10 MHz. Crystal 29 is maintained within a separate airtight container (not shown) and is also maintained in an inert gaseous atmosphere. The purpose of so maintaining crystal 29 is to avoid, or at least to minimize, any contamination of the crystal which would cause the resonant frequency of the crystal to vary. Also positioned within the chamber 22 is a second piezoelectric crystal 31 which has the same characteristics as the crystal 29, that is, the resonant frequency of crystal 31 is also 10 MHz. The two crystals, 29 and 31 are both of the AT cut type (31°25' off the Z axis) and are mounted on the Z axis so as to maximize their accuracy. Fixedly connected between the diaphragms 24 and 26 is a rigid beam or member 32 made of a non-corrosive material such as stainless steel and having a dimension between the diaphragms 24 and 26 approximately 0.001 inches greater than the distance between the unstressed diaphragms, thereby stressing the diaphragms and bowing them in an outward direction, thus causing the diaphragms to, as previously noted, be arcuately curved. The beam 32 is free to move in accordance with the movement of the diaphragms 24 and 26. A rigid extension member 34 constructed of a non-corrosive metal, such as stainless steel and having dimensions of generally about 0.25 inches by 0.25 inches and a length of less than 1 inch is fixedly connected at one end thereof to the beam 32, and a rigid rod or prong 36 made of non-corrosive stainless steel and having a length of approximately one-half inch is fixedly connected to the other end of the extension member 34. The prong 36 is located so as to be suitably positioned to apply pressure to the crystal 31 by means of its finely tapered point when the movement of the prong is caused by the movement of the beam 32, the latter movement in turn being caused by the movement of the diaphragms 24 and 26.

A control unit 38 is positioned outside the container 12 and is electrically coupled to the sensor unit located within the container 12. The control unit 38 includes a conventional electronic crystal excitation circuit and a conventional modulator circuit both of which are well known in the art and are therefore neither shown nor more fuly described. The crystal excitation portion of control unit 38 is connected, by means of a conductor 40, to the crystal 29 and excites the crystal to vibrate at its resonant frequency, thereby providing a series of pulses at such frequency. The crystal 29 is also connected to the control unit 38, by a conductor 42, for providing the output pulses of the crystal 29 to the modulator section thereof. The excitation portion of the control unit 38 is also connected, by means of a conductor 44, to the crystal 31, thereby exciting the crystal 31 to vibrate and provide a series of output pulses. The crystal 31 is further connected to the control unit 38 by a conductor 46, for providing the output pulse series of the crystal 31 to the modulator section thereof.

The operation of the apparatus will now be described in detail. A fluid, whether it be gaseous or liquid, flowing in the conduit 2 in the direction indicated by the arrow 8 passes through the orifice 6 in orifice plate 4. Because, as noted above, orifice 6 has a diameter which is smaller than the diameter of the conduit 2 the fluid pressure $P_1$ at the upstream side of plate 4 is greater than the pressure $P_2$ at the downstream side of plate 4. A portion of the fluid flows, under pressure $P_1$, into the chamber 14 via the conduit 18 and a portion of the fluid flows, under pressure $P_2$, into the chamber 16 via the conduit 20. The fluid in chamber 14 acts, with the pressure $P_1$, against stainless steel diaphragm 24 urging it in a first direction (left to right, as illustrated in the figure). The fluid in chamber 16 acts, with the pressure $P_2$, against diaphragm 26 urging it in a second direction, opposite to the first direction (right to left as seen in the figure). The two diaphragms are fixedly connected to one another by the rigid beam 32 by, for example, of welding, and clearly therefore the two diaphragms, will move in unison. With the direction of fluid flow in the conduit 2 as indicated b the arrow 8, the pressure differential $P_1 - P_2$ will cause the diaphragms 24 and 26 to move to the right as shown in the FIGURE. Further, it will be understood that the greater the flow velocity the greater will be the differential pressure $P_1 - P_2$ and the greater will be the distance the diaphragms will move to the right. Conversely, in the absence of fluid flow, the differential pressure $P_1 - P_2$ will be zero and there will be no diaphragm movement.

At this point it is appropriate to note that the diaphragms 24 and 26 are identical in construction and configuration. They are, as previously noted, made of non-corrosive stainless steel so that they will be less likely to undergo chemical reaction with the fluid in chambers 14 and 16 and they are stressed to have an arc of curvature of approximately 0.0005°. This diaphragm curvature has been selected because, as previously noted, it has been found that such a curvature tends to minimize the hysteresis of the diaphragms, thereby substantially increasing the accuracy of the apparatus.

As indicated above, the crystal 29 is one which is selected to be highly accurate and stable and it is separately maintained in an inert atmosphere so as to increase its period of stability. The crystal 29 is electronically excited by the control unit 38 via electrical connecton 40 and the crystal provides as its output signal a series of pulses at a known resonant frequency, such as, for example, 10 MHz. For purposes of convenience, the crystal 31 is selected to be identical to crystal 29 although, as will be clear from the discussion below, this is not necessary. The prong 36 is positioned so that when there is no fluid flow in the conduit 2 ($P_1$ and $P_2$ therefore being equal and diaphragms 24 and 26 being unmoved from their unloaded position), prong 36 is contiguous with, but does not apply any pressure to, the crystal 31. The crystal 31 is, as noted above, excited by the control unit 38 via electrical connection 44 and the crystal 31, as well as the crystal 29, has an output signal which is a series of pulses at the resonant frequency of the crystal, here 10 MHz. As is well known, however, when a force is applied to such a piezoelectric crystal, the output pulse frequency from the crystal decreases as the pressure applied to the crystal is increased. It will therefore be understood that as the fluid flow velocity increases in the direction of the arrow 8 (thereby increasing the pressure differential $P_1 - P_2$ and causing diaphragms 24 and 26, the beam 32 and the prong 36 to move further, and with greater force, to the right as shown in the FIGURE), the frequency of the output signal from the crystal 31, i.e., the series of pulses provided to the modulator portion of the control unit 38 will decrease. Conversely, as the fluid flow velocity decreases, the diaphragms 24 and 26, the beam 32 and the prong 36 will move a lesser distance, and with a lesser force, to the right and prong 36 will therefore apply a smaller force to the crystal 31, thereby causing the frequency of the output signal from the crystal 31 to increase toward the resonant frequency of the unloaded crystal. It will now be realized that the output of the modulator section of the control unit 38, which is a series of pulses at a frequency equal to the difference in output frequency of the crystals 29 and 31 is directly related to the force applied to the crystal 31 by the prong 36, which is in turn directly related to the velocity of the fluid flow in the conduit 2.

It will now be understood that, although for ease of illustration the instant invention has been described as utilizing two identical piezoelectric crystals, it is not necessary that the crystals be identical inasmuch as any pulse frequency provided by the modulator section of the control unit 38 may be utilized as the zero flow velocity level. Thus, for example, the crystals 29 and 31 can be chosen to have resonant frequencies of 10 MHz and 5 MHz, respectively. In such case a pulse output at a frequency of 5 MHz from the modulator section of the control unit 38 corresponds to a zero fow velocity and a positive flow velocity results in the modulator providing a pulse output frequency of between 5 MHz and 10 MHz.

The ease with which the instant apparatus may be calibrated will now be readily realized. Thus, the mere closing of a valve in the conduit 2 on the downstream side of the orifice plate 4 will cause $P_1$ and $P_2$ to be equal, since the fluid flow velocity will be zero. Under such a condition the pulse frequency from the modulator section of the control unit 38 will, where the crystals 29 and 31 are identical, be zero. In the event, however, that (due to aging or contamination, for example) the unloaded resonant frequencies of the two crystals are not identical, the base line for a no-flow condition can be set to whatever pulse frequency is provided by the modulator. For example, in the circumstances where there is no fluid flow in conduit 2 and the pulse output frequency of the modulator section of the control unit 38 is 100 KHz, it will be understood that the unloaded resonant frequency of the crystal 31 is now 9.9 MHz rather than the desired 10 MHz. It is, however, a simple matter to adjust the measurement system, e.g., a digital computer, so as to enable it to utilize the 100 KHz signal as the base signal for determining the fluid flow velocity. Al;l that is required is an instruction to the computer to utilize the modulator output frequency less 100 KHz rather than the modulator output frequency in flow velocity calculations.

It may now be seen that the instant invention provides apparatus for measuring a pressure differential which is highly accurate and mechanically simple. Further, because the information provided by the apparatus is in digital rather than in analog form, it is readily usable to determine other desired information, such as total flow quantity, etc. Further digitized information ay be transmitted (and received) via wire or radio links. Finally, the structure may be arranged to receive information for controlling flow in the monitored piping.

It will be understood that the foregoing description of the preferred embodiment of the present invention is for purposes of illustration only, and that the various structural and operational features as herein disclosed are susceptible to a number of modifications and changes, none of which entail any departure from the spirit and scope of the present invention as defined in the hereto appended claims.

What is claimed is:

1. Digital pressure differential measurement apparatus comprising:
   a first electromechanical transducer adapted to provide a first series of pulses at a first frequency;
   a second electromechanical transducer adapted to provide a second series of pulses at a second frequency, which second frequency is inversely related to a force applied to said second transducer;
   force applying means responsive to a pressure differential adapted to apply a force, directly related to said pressure differential, to said second transducer; and
   modulator means adapted to receive said first and second series of pulses and to provide a third series of pulses at a third frequency, said third frequency being related to the difference between said first and second frequencies.

2. Digital pressure differential measurement apparatus according to claim 1 wherein said first and second electromechanical transducers are piezoelectric crystals.

3. Digital pressure differential measurement apparatus according to claim 2 wherein said first and second crystals are electrically driven and have generally identical characteristics.

4. Digital pressure differential measurement apparatus according to claim 1 wherein said force applying means comprises;
   a first diaphragm urged in a first direction in response to a first pressure acting in said first direction;
   a second diaphragm urged in a second direction opposite to said first direction in response to a second pressure acting in said second direction; and
   stress means coupled to said first and second diaphragms and adapted to move in response to movement of said diaphragms.

5. Digital pressure differential measurement apparatus according to claim 4 wherein said stress means comprises:
   a rigid member connected between said first and second diaphragms; and
   a rigid rod connected to said member and adapted to apply a force, directly related to the movement of said member, to said second transducer.

6. Digital pressure differential measurement apparatus comprising:
   a fluid carrying conduit having a first diameter;
   constriction means positioned within said conduit, said constriction means having a second diameter smaller than the first diameter,
   whereby the difference between the fluid pressures at opposite sides of said constriction means is directly related to the flow velocity of said fluids;

first pressure responsive means urged in a first direction in response to the fluid pressure at one side of said constriction means;

second pressure responsive means urged in a second direction, opposite to said first direction, in response to the fluid pressure at the other side of said constriction means; and means responsive to the location of said first and second pressure responsive means for providing a series of pulses at a frequency directly related to the flow velocity of said fluid, wherein said location responsive means comprises;

a first pulse providing means for providing a first series of pulses at a pre-selected frequency;

a second pulse providing means for providing a second series of pulses at a frequency related to the location of said first and second pressure responsive means; and modulator means for receiving said first and second series of pulses and for providing a series of pulses at a frequency related to the difference between the frequencies of said first and second series of pulses.

7. Digital pressure differential measurement apparatus according to claim 6 wherein said first and second pulse providing means are each electrically driven piezoelectric crystals.

8. Digital pressure differential measurement apparatus according to claim 7 wherein said first and second pressure responsive means are each arcuately curved stainless steel diaphragms having an arc of curvature of approximately 0.0005°.

9. Digital pressure differential measurement apparatus according to claim 8 wherein said movement responsive means further comprises:

a rigid member connected between said first and second diaphragms; and a rigid rod connected to said rigid member, said rod moving in response to the movement of said diaphragms, for applying a force to said second piezoelectric crystal.

* * * * *